United States Patent
Kirchner et al.

(10) Patent No.: US 9,169,987 B2
(45) Date of Patent: Oct. 27, 2015

(54) LIGHTING APPLIANCE FOR VEHICLES

(71) Applicant: Hella KGaA Hueck & Co., Lippstadt (DE)

(72) Inventors: Christoph Kirchner, Verl (DE); Martin Mügge Mügge, Geseke (DE); Heinz Albert Püttmann, Hamm (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 0 days.

(21) Appl. No.: 14/101,711

(22) Filed: Dec. 10, 2013

(65) Prior Publication Data

US 2014/0169016 A1   Jun. 19, 2014

(30) Foreign Application Priority Data

Dec. 11, 2012  (DE) .......................... 10 2012 112 072

(51) Int. Cl.
*F21V 9/00*   (2015.01)
*F21S 8/10*   (2006.01)
*B60Q 1/00*   (2006.01)

(52) U.S. Cl.
CPC ......... *F21S 48/2243* (2013.01); *F21S 48/2206* (2013.01); *B60Q 1/0041* (2013.01); *F21S 48/215* (2013.01)

(58) Field of Classification Search
CPC ............... A01B 12/006; F21S 48/2206; F21S 48/2243; F21S 48/215; B60Q 1/0041
USPC .................................. 362/487, 496, 498, 499
See application file for complete search history.

(56) References Cited

U.S. PATENT DOCUMENTS

| | | | |
|---|---|---|---|
| 6,305,813 B1 * | 10/2001 | Lekson et al. | 362/625 |
| 2002/0071267 A1 * | 6/2002 | Lekson et al. | 362/31 |
| 2004/0130904 A1 | 7/2004 | Yamada et al. | |
| 2009/0027910 A1 * | 1/2009 | Nagasawa et al. | 362/518 |
| 2009/0154186 A1 * | 6/2009 | Natsume et al. | 362/516 |
| 2010/0246200 A1 * | 9/2010 | Tessnow et al. | 362/509 |
| 2011/0170307 A1 * | 7/2011 | Ishikawa et al. | 362/516 |
| 2012/0250343 A1 * | 10/2012 | Koizumi | 362/511 |

FOREIGN PATENT DOCUMENTS

| | | |
|---|---|---|
| DE | 10036324 A1 | 2/2002 |
| DE | 10231326 A1 | 2/2004 |
| DE | 10355210 A1 | 6/2005 |
| DE | 10332977 A1 | 7/2005 |
| DE | 102006002322 A1 | 12/2007 |

(Continued)

*Primary Examiner* — Donald Raleigh
(74) *Attorney, Agent, or Firm* — Husch Blackwell LLP

(57) ABSTRACT

A lighting appliance for vehicles includes a flat light guide having a light coupling section for the coupling of light into a first or a second end of the light guide, a narrow-side front serving as a light coupling section for the coupling-out of light into the main radiation direction extending between the first end and the second end of the flat light guide, a first flat side and a second flat side arranged on the opposite side, on which the coupled-in light can be fully reflected, a rear extending between the first end and the second end of the flat light guide having a number of optic elements for the redirection of the light into the direction of the narrow-side front, wherein the flat light guide is held with fastening means in a holding section of a holding lens running at right angles to the main radiation direction.

10 Claims, 1 Drawing Sheet

(56) References Cited

FOREIGN PATENT DOCUMENTS

| DE | 102010023359 | A1 | 4/2011 |
| DE | 102010012745 | A1 | 9/2011 |
| DE | 102010061210 | A1 | 6/2012 |
| EP | 2354637 | A2 | 8/2011 |

* cited by examiner

LIGHTING APPLIANCE FOR VEHICLES

CROSS REFERENCE

This application claims priority to German Patent Application No. 10 2012 112072.2, filed Dec. 11, 2012.

TECHNICAL FIELD OF THE INVENTION

The invention relates to a lighting appliance for vehicles with a flat light guide comprising a light coupling section for the coupling of light into a first end and/or into a second end of the light guide, a narrow-side front serving as a light coupling section for the coupling-out of light into the main radiation direction extending between the first end and the second end of the flat light guide, a first flat side and a second flat side arranged on the opposite side, on which the coupled-in light can be fully reflected, a rear extending between the first end and the second end of the flat light guide having a number of optic elements for the redirection of the light into the direction of the narrow-side front.

BACKGROUND OF THE INVENTION

From DE 10 2010 061 210 A1, a lighting appliance for vehicles is known, in which a flat light guide is provided for the generation of a specified light distribution. The flat light guide has opposing flat sides, on which the coupled-in light is conducted. On a narrow side, several LED light sources are provided, so that on this narrow side, light is coupled into the flat light guide. A narrow-sided rear has optic elements for the redirection of the coupled-in light into the direction of a narrow-sided front, on which the light is coupled out toward the front. The known flat light guide allows a signal light function having a depth effect. However, due to a further signal light function arranged behind the flat light guide, fastening means for the holding of the flat light guide in its mounting position can only be arranged at the ends of the flat light guide. Therefore, the flat light guide must be arranged so that its ends protrude.

From WO 2012/059852 A1, a lighting appliance for vehicles is known, in which a flat light guide is force-lockingly held between two blind plates in a sandwich-type manner. The disadvantage of this invention is that the signal function is limited to a linear light radiation and that the plates provided for the fastening of the flat light guide are comparatively thick, so that for the fastening of the flat light guide, a relatively large installation space is required.

Therefore, the task of the present invention is the further development of a lighting appliance for vehicles with a flat light guide so that on one hand a noticeable depth effect is created and on the other hand a safe, space-saving fastening of the flat light guide is ensured.

SUMMARY OF THE INVENTION

To solve this task, the flat light guide is held in a holding section of a holding lens running at right angles to the main radiation direction.

The invention allows a space-saving and safe fastening of a flat light guide in a housing of a lighting appliance. A vertical holding lens being embodied in a profiled manner, so as to holding the flat light guide on the holding lens in a holding section via fastening means, is arranged on the rear of the flat light guide. The fastening of the flat light guide can be executed either continuous or punctiform, depending on the stability requirements.

According to a preferred embodiment of the invention, the holding section of the holding lens has a groove, in which a fastening web of the flat light guide can engage for the fastening of the latter on the holding lens. The groove can have a width with is identical with or larger than a thickness of the flat light guide. Depending on the requirements, the flat light guide can be fastened in the groove in a form- and/or force-locking manner or by means of substance-to-substance bonding.

According to a further development of the invention, the holding section of the holding lens has a stopping face abutting on the rear of the flat light guide. This stopping face is executed opaque and/or with optic elements, so that any stray light exiting on the rear of the flat light guide does not remain in the housing of the lighting appliance, but is guided back into the flat light guide.

According to a further development of the invention, the holding lens has several holding sections arranged at a distance relative to one another, between which a light passage section is arranged. The light passage section has a translucent or transparent light passage surface, so that light can be radiated in the main radiation direction between flat light guides arranged at a distance relative to one another, which is generated by a lightsource unit respectively a light unit arranged behind the flat light guide. By this means, several light functions can be generated in a space-saving manner, the holding lens having two functions. On one hand it serves the fastening of a multitude of flat light guides for the generation of a first light function in the holding section. On the other hand it preferably serves a further light function arranged in the back area with its light passage sections for the conducting of light.

According to a further development of the invention, the holding lens is embodied as an integrally molded injection-molding part, which is preferably produced by means of two-component injection molding. The holding section is opaque and/or equipped with optic elements, while the light passage section is executed clear.

According to a further development of the invention, a flat blind following the contour of the flat light guide abuts to at least one flat side of the flat light guide. The flat blind can consist of an opaque material and/or be provided with an optical structure or with metalization. A narrow front side of the flat blind serves as light de-coupling surface, so that a partial area illumination is ensured on the front.

In addition, it allows an intensified depth effect of the flat light guide particularly also in the illuminated state.

According to a further development of the invention, the flat light guide and/or the flat blind has a transverse step on its rear, which is held in the groove of the holding lens. The transverse step serves as a support or base for the fastening to the holding lens. Preferably, the transverse step has a length corresponding at least to a sum of the thickness of the flat light guide and the flat blind. The rear of the flat light guide, respectively of the flat blind has this transverse step, so that as large as possible a light flux can be redirected to the front, respectively distributed within the light guide.

According to a further development of the invention, the flat light guide and/or the flat blind can be fastened on the holding lens by means of rivets or screws or by welding. This can be executed either punctiform or continuous. By this means, a relatively stable support of the lighting appliance is ensured.

These aspects are merely illustrative of the innumerable aspects associated with the present invention and should not be deemed as limiting in any manner These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

Figure 1:
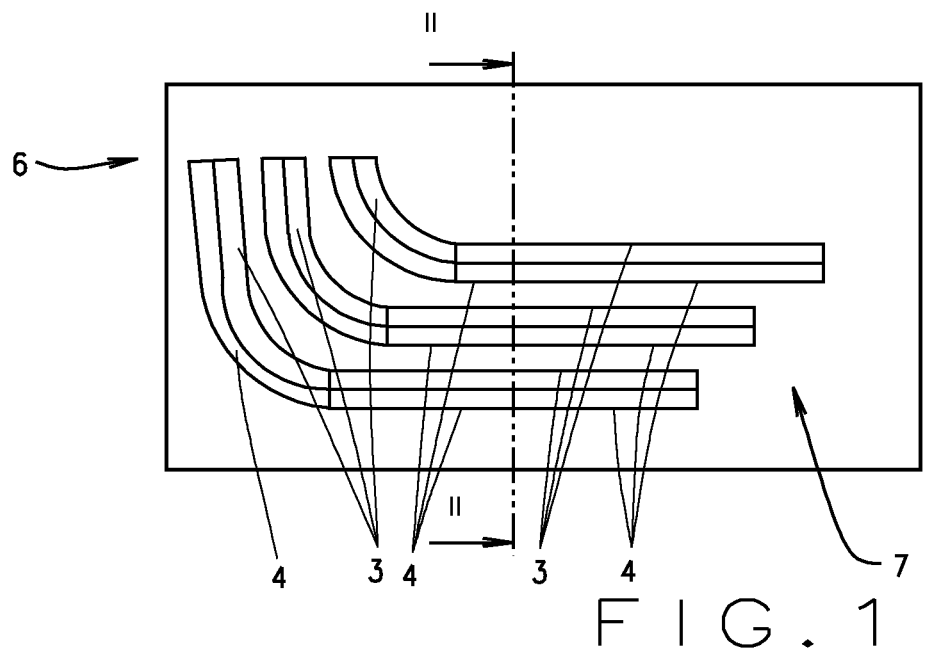
FIG. 1 a front view of a lighting appliance.
Figure 2:
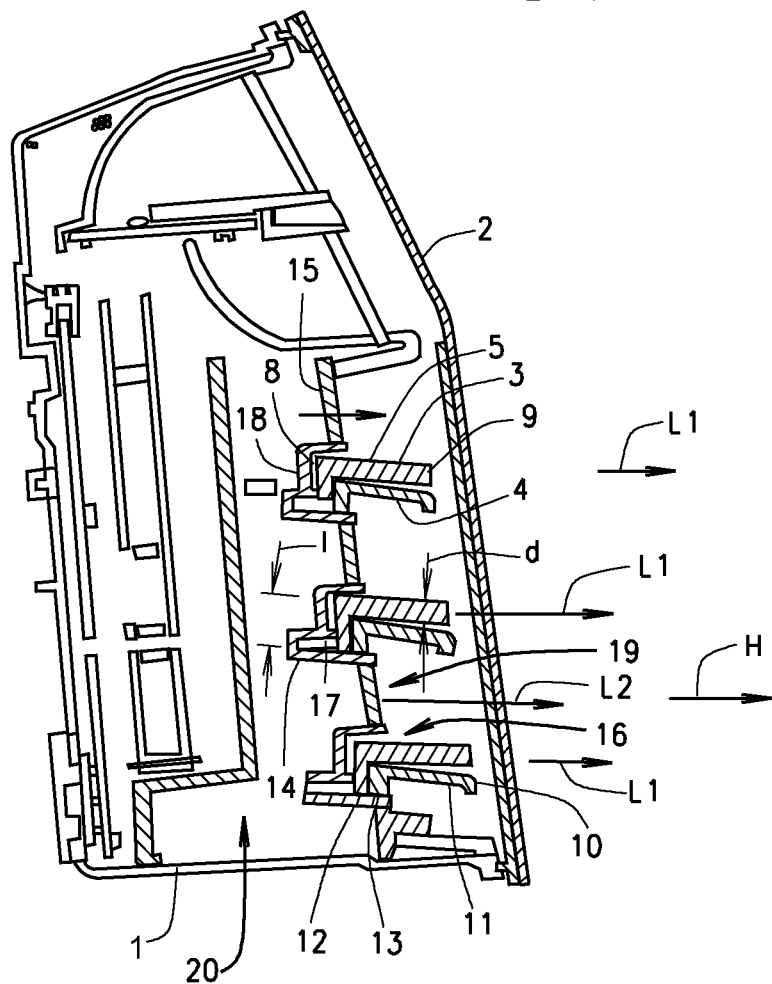
FIG. 2 a vertical section through the lighting appliance along the line II-II in FIG. 1.

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

A lighting appliance for vehicles has a housing 1, which can be applied as a headlamp in the front area or as tail lamp for the generation of a signal function, for example a tail and stoplight function. In the present example, the cup-shaped housing 1 is arranged in the rear of the vehicle and closed by means of a clear or tinted cover lens 2.

For the generation of a tail light function, a multitude of flat light guides 3 and flat blinds 4 directly abutting with their flat sides, both arranged at a distance relative to one another, is arranged inside the housing 1.

The flat light guide 3 is embodied plate-shaped and has two opposing flat sides 5 extending essentially in the horizontal direction. Relative to a vertical lateral part of the vehicle body, the flat sides 5 run in an upward bow, so that on a first end 6 of the flat light guide 3 a narrow-side face for the coupling-in of light of the latter runs horizontal and on a second end 7 of the same a narrow-side face for the coupling-in of light runs vertical. Optionally, the coupling-in of light can also be executed on one of the two ends 6, 7. For the coupling-in of light, an LED light source is preferably used, which is arranged on a PCB that is not shown.

Furthermore, the flat light guide 3 has a rear 8 running between the first end 6 and the second end 7, which can be provided with a number of optic elements for the redirection of the coupled-in light into the direction of a narrow front side 9. The narrow front 9 runs opposite the rear 8 and serves as a surface for the coupling-out of light L1 in the main radiation direction H. The front 9 of the flat light guide 3 can have an optical structure for the dispersion of the radiated light L1.

The flat blinds 4 being shaped to follow the contour of the flat light guides 3 each abut on a lower flat side 5 of the flat light guide 3. In the present embodiment, a front 10 of the blind 4 is arranged flush with the front 9 of the flat light guide 3. The blinds 4 each have opposing flat sides 11.

A rear of the light guide 3 resp. of the blind 4 facing away from the main radiation direction H each has a transverse step 12 resp. 13, so that the rear of the light guide 3 and the blind 4 is each embodied in an angled manner. The transverse step 12 of the light guide 3 has a length 1, which is identical with or slightly larger than the thickness d of the light guide 3 and the blind 4 forming an optical unit. The transverse steps 12, 13 of the light guides resp. the blinds 4 form a base being arranged fixed with fastening means in a groove 14 of a holding lens 15 running vertical and at a distance to the cover lens 2. The groove 14 is part of a holding section 16 of the holding lens 15 holding the light guide 3 and the blind 4 together in a form-locked and/or force-locked or substance-to-substance bonded manner. The fastening of the light guide 3 resp. the blind 4 can for example be achieved by means of rivets or screws or by welding. The rear of the light guide 3 has, for example, a fastening web 17 as a fastening means, which engages in the groove 14 of the holding lens 15.

The holding section 16 of the holding lens 15 has a stopping face 18 arranged adjacent to the groove 14, said stopping face 18 abutting on the transverse step 12 of the light guide The stopping face 18 is executed opaque and/or with optic elements, so that any stray light exiting on the rear of the flat light guide 3 does not remain in the housing 1, but is guided back into the flat light guide 3. Preferably, the entire holding section 16 of the holding lens 15 is made from an opaque material or a material equipped with optic elements.

A plane light passage section 19 having a translucent and/or transparent light passage surface is arranged between neighboring holding section 16 of the holding lens 15. This allows the radiation of light L2 of a second light function, for example a stop light function, between the light guides 3 resp. the blinds 4. A light unit for the generation of the stop light function is arranged in a region 20 behind the holding lens 15 of the housing 1.

The holding lens 15 is embodied as a molded part produced by means of two-component injection-molding, wherein, on one hand, the holding section 16 is executed opaque and/or with optic elements and on the other hand the light passage section 19 is executed clear. The blind 4 is made from an opaque material and provided with an optical structure, if required. By this means, light L1 coupled into the light guide can additionally be radiated via the front 1 of the blind 4 in the main radiation direction H, allowing an improved depth effect of the light unit formed by the light guide 3 and the blind 4.

The light guide 3 with its flat sides 5 has a depth of for example 15 mm to 20 mm. In the present example three light guide/blind pairs are arranged one above the other and at a distance relative to one another.

The holding section 16 of the holding lens 14 has a U-shaped profile and extends continuously from the first end 6 to the second end 7. The fastening of the respective light guides 3 resp. blinds 4 can be either executed punctiform or continuous in the extension direction of the light guide 3 resp. the blind 4. The light guide 3 and the blind 4 each have a rectangular cross-section, wherein the transverse step 12, 13 is provided only on the rear. The light guide 3 is preferably made from a clear plastic material.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

Reference Sign List 1 housing
2 cover lens
3 flat light guide 4 flat blind
5 flat side
6 first end
7 second end
8 rear
9 front
10 front
11 flat side
12 transverse step
13 transverse step
14 groove
15 holding lens
16 holding section
17 fastening web
18 stopping face
19 light passage section
20 region
d thickness
H main radiation direction
L length
L1, L2 light

The invention claimed is:

1. A lighting appliance for vehicles comprising:
   a flat light guide;
   a light coupling section for the coupling of light into at least one of a first or second end of the light guide;
   a narrow front serving as a light coupling section for the coupling-out of light into the main radiation direction extending between the first end and the second end of the flat light guide;
   a first flat side and a second flat side arranged on the opposite side, on which the coupled-in light can be fully reflected;
   a rear extending between the first end and the second end of the flat light guide having a number of optic elements for the redirection of the light into the direction of the narrow front;
   wherein the flat light guide is held with fastening means in a holding section of a holding lens running at right angles to the main radiation direction.

2. The lighting appliance according to claim 1, wherein the holding section of the holding lens has a groove in which a fastening web of the flat light guide can engage for fastening the flat light guide on the holding lens.

3. The lighting appliance according to claim 2, wherein the flat light guide can be fastened in at least one of a form-locked, force-locked, and substance-to-substance bonded manner in the groove of the holding lens.

4. The lighting appliance according to claim 1, wherein the holding section of the holding lens has a stopping face on which the rear of the flat light guide abuts, wherein the stopping face is at least one of opaque and with optic elements.

5. The lighting appliance according to claim 1, wherein the holding lens has several holding sections with at least one groove each for holding a plurality of flat light guides arranged at a distance relative to one another, the lighting appliance further including a light passage section with at least one of a translucent and transparent light passage surface between the holding sections.

6. The lighting appliance according to claim 1, wherein the holding lens is integrally molded as an injection-molded part comprising two components, wherein the holding section of the holding lens on one hand is at least one of opaque and with optic elements and the light passage section is transparent.

7. The lighting appliance according to claim 1, wherein a flat blind abuts a flat side of the flat light guide with a front having the same contour as the front of the flat light guide, and wherein the flat blind is at least one of opaque and with an optical structure.

8. The lighting appliance according to claim 7, wherein on a side facing the holding lens, at least one of the flat light guide and the flat blind has a transverse step being held in the groove of the holding lens, and wherein the transverse step of the flat light guide has a length corresponding at least to the sum of a thickness of the part of the flat light guide and the flat blind abutting in the main radiation direction.

9. The lighting appliance according to claim 1, wherein the narrow front of the flat light guide has an optical structure.

10. The lighting appliance according to claim 7, wherein at least one of the rear of the flat light guide and the flat blind can be fastened in the groove of the holding lens by means of rivets or screws or by welding.

* * * * *